US012119167B2

(12) United States Patent
Misaki et al.

(10) Patent No.: US 12,119,167 B2
(45) Date of Patent: Oct. 15, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takashi Misaki, Yokkaichi (JP); Kohei Yoshikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 838 days.

(21) Appl. No.: 16/972,262

(22) PCT Filed: May 30, 2019

(86) PCT No.: PCT/JP2019/021640
§ 371 (c)(1),
(2) Date: Dec. 4, 2020

(87) PCT Pub. No.: WO2019/235368
PCT Pub. Date: Dec. 12, 2019

(65) Prior Publication Data

US 2021/0159011 A1 May 27, 2021

(30) Foreign Application Priority Data

Jun. 5, 2018 (JP) ................................ 2018-108162

(51) Int. Cl.
*H01F 17/04* (2006.01)
*H01F 27/06* (2006.01)
(Continued)

(52) U.S. Cl.
CPC .......... *H01F 27/346* (2013.01); *H01F 27/06* (2013.01); *H01F 27/255* (2013.01);
(Continued)

(58) Field of Classification Search
CPC .................................................. H01F 27/2823
(Continued)

(56) References Cited

U.S. PATENT DOCUMENTS

2013/0088317 A1* 4/2013 Tawara .................. H01F 17/06 336/212
2013/0293335 A1* 11/2013 Yoshikawa ............ H01F 27/02 29/602.1
2016/0055953 A1* 2/2016 Hirata .................. H01F 27/327 336/96

FOREIGN PATENT DOCUMENTS

JP 2013-143454 A 7/2013
JP 2017-11186 A 1/2017
(Continued)

OTHER PUBLICATIONS

English translation of WO201313701 (Year: 2013).*
International Search Report, Application No. PCT/JP2019/021640, mailed Jul. 9, 2019.

*Primary Examiner* — Ronald Hinson
(74) *Attorney, Agent, or Firm* — Honigman LLP

(57) ABSTRACT

A reactor includes a coil having a winding portion, a magnetic core, and a holding member holding an end surface of the winding portion and the outer core portion of the magnetic core, the holding member having a through hole into which an end portion of the inner core portion of the magnetic core is inserted. One of the inner core portion and the outer core portion is a hybrid core composed of a powder compact and a resin core molded on an outer periphery of the powder compact, and the other of the inner core portion and the outer core portion is a hybrid core or a resin core.
(Continued)

The resin core of the inner core portion and the resin core of the outer core portion are continuous with each other via the through hole of the holding member so as to form a seamless single body.

5 Claims, 6 Drawing Sheets

(51) Int. Cl.

| | |
|---|---|
| ***H01F 27/255*** | (2006.01) |
| ***H01F 27/28*** | (2006.01) |
| ***H01F 27/32*** | (2006.01) |
| ***H01F 27/34*** | (2006.01) |
| ***H01F 41/02*** | (2006.01) |
| ***H01F 41/06*** | (2016.01) |

(52) U.S. Cl.

CPC ......... *H01F 27/2823* (2013.01); *H01F 27/32* (2013.01); *H01F 41/0246* (2013.01); *H01F 41/06* (2013.01)

(58) Field of Classification Search

USPC .......................................................... 336/221

See application file for complete search history.

(56) References Cited

FOREIGN PATENT DOCUMENTS

| | | | |
|---|---|---|---|
| JP | 2017-126679 | A | 7/2017 |
| JP | 2017-224801 | A | 12/2017 |
| WO | 2009-125593 | A1 | 10/2009 |

* cited by examiner

REACTOR

CROSS-REFERENCE TO RELATED APPLICATIONS

This application is the U.S. national stage of PCT/JP2019/021640 filed on May 30, 2019, which claims priority of Japanese Patent Application No. JP 2018-108162 filed on Jun. 5, 2018, the contents of which are incorporated herein.

TECHNICAL FIELD

The present disclosure relates to a reactor.

BACKGROUND

For example, JP 2017-11186A discloses a reactor for use as, for example, a constituent part of a converter installed in a hybrid automobile, the reactor including a coil having a winding portion formed by winding a wire, and a magnetic core that forms a closed magnetic circuit. The magnetic core of this reactor is an integrally molded product made of a composite material containing a soft magnetic powder and a resin, and can be divided into an inner core portion that is arranged inside the winding portion and an outer core portion that is arranged outside the winding portion. Also, J P 2017-11186A discloses a configuration in which a frame plate portion (holding member) that holds an end surface of the winding portion of the coil and the outer core portion is provided.

The reactor of JP 2017-11186A can be produced simply by arranging the coil in a mold and then injection molding the composite material in the mold. However, with the reactor of JP 2017-11186A, since the entire magnetic core is the integrally molded product made of the composite material, it is difficult to adjust the magnetic characteristics of the entire magnetic core simply by adjusting the amount of soft magnetic powder contained in the composite material. For example, if the amount of soft magnetic powder is small, the magnetic permeability of the magnetic core is low, and for this reason it is necessary to increase the size of the magnetic core in order to produce a reactor that satisfies desired magnetic characteristics. On the other hand, if the amount of soft magnetic powder is increased, the magnetic permeability of the magnetic core increases, and accordingly the size of the magnetic core can be reduced, but the magnetic core becomes likely to be magnetically saturated. To address this issue, according to JP 2017-11186A, an air gap is provided in the middle of the outer core portion, or a non-magnetic gap material is embedded therein. However, if a gap is provided in the position of the outer core portion, a problem arises in which magnetic flux leakage to the outside of the reactor is likely to occur.

Thus, an object of the present disclosure is to provide a reactor that makes it easy to adjust magnetic characteristics and has excellent productivity.

SUMMARY

A reactor according to the present disclosure is a reactor including: a coil having a winding portion that is formed by winding a wire; a magnetic core having an inner core portion and an outer core portion; and a holding member that holds an end surface of the winding portion in an axial direction and the outer core portion. The inner core portion is arranged inside the winding portion, the outer core portion is arranged outside the winding portion, and the holding member is a frame-like member having a through hole into which an end portion of the inner core portion in the axial direction is inserted. Wherein, one of the inner core portion and the outer core portion is a hybrid core composed of a powder compact and a resin core molded on an outer periphery of the powder compact, and the other of the inner core portion and the outer core portion is a hybrid core or a resin core. The resin core of the inner core portion and the resin core of the outer core portion are continuous with each other via the through hole of the holding member and form a single body. The powder compact is a magnetic body obtained by compression molding a raw material powder containing a soft magnetic powder. The resin core is a magnetic body obtained by molding a composite material in which a soft magnetic powder is dispersed in a resin.

First, aspects of the present disclosure will be listed and described.

In a first aspect, a reactor according to an embodiment includes a coil having a winding portion that is formed by winding a wire. A magnetic core has an inner core portion and an outer core portion. A holding member holds an end surface of the winding portion in an axial direction and the outer core portion. The inner core portion is arranged inside the winding portion. The outer core portion is arranged outside the winding portion. The holding member is a frame-like member having a through hole into which an end portion of the inner core portion in the axial direction is inserted. Wherein, one of the inner core portion and the outer core portion is a hybrid core composed of a powder compact and a resin core molded on an outer periphery of the powder compact, and the other of the inner core portion and the outer core portion is a hybrid core or a resin core. The resin core of the inner core portion and the resin core of the outer core portion are continuous with each other via the through hole of the holding member and form a single body. The powder compact is a magnetic body obtained by compression molding a raw material powder containing a soft magnetic powder, and the resin core is a magnetic body obtained by molding a composite material in which a soft magnetic powder is dispersed in a resin.

In general, it is easy to increase the amount of soft magnetic powder contained in a powder compact. Accordingly, it is easy to increase the magnetic permeability of a magnetic core in which a powder compact is used. Meanwhile, it is easy to change the amount of soft magnetic powder contained in a resin core. Accordingly, it is easy to adjust of the magnetic permeability of a magnetic core in which a resin core is used, and the magnetic core is thus unlikely to be magnetically saturated. For these reasons, with the above-described reactor in which at least one of the inner core portion and the outer core portion is a hybrid core, even though the magnetic core is a seamless single body, it is easy to adjust the magnetic characteristics of the magnetic core.

Moreover, since the magnetic core of the above-described reactor is a seamless single body, the reactor has excellent productivity. The reason for this is that the reactor can be completed simply by arranging the coil, the holding member, and the powder compact in a mold, filling the composite material into the mold, and then curing the composite material. The resin core filled into the mold is molded on the outer periphery of the powder compact, and the hybrid core is thereby formed.

As a form of the reactor according to the embodiment, a form is conceivable in which the outer core portion is the hybrid core, and the inner core portion is the resin core.

In a hybrid core in which the outer periphery of a powder compact having a relatively high magnetic permeability is covered by a resin core having a lower specific magnetic permeability than the powder compact, magnetic flux leakage to the outside of the hybrid core is unlikely to occur. Therefore, when the outer core portion is constituted by the hybrid core, magnetic flux leakage to the outside of the outer core portion can be suppressed, and it is thus possible to reduce the effect of the leakage flux on other electric devices.

As a form of the reactor according to the description above, a form is conceivable in which the holding member has, on one surface side thereof, a core housing portion that houses a portion of the powder compact. A portion of an inner wall surface of the core housing portion protrudes in a direction away from a peripheral surface of the powder compact, and a spaced-apart portion where the inner wall surface and the peripheral surface are spaced apart from each other is provided at the protruding position of the inner wall surface. The spaced-apart portion is in communication with the through hole.

With this configuration, the reactor can be completed simply by arranging, in a mold, an assembly in which the powder compact and the coil are combined with the holding member, and then filling the composite material to a position on the outer side of the powder compact in the mold. The composite material filled into the mold spreads along the outer periphery of the powder compact and then flows into the spaced-apart portion, and furthermore, passes through the through hole of the holding member from the spaced-apart portion and then flows into the inside of the winding portion. The composite material arranged along the outer periphery of the powder compact is then cured and thereby forms the resin core that covers the outer periphery of the powder compact, while the composite material flowing into the inside of the winding portion is cured and thereby forms the inner core portion constituted by the resin core. The inner core portion is continuous with the resin core of the outer core portion via the through hole and the spaced-apart portion, and the magnetic core is thus formed as a single body.

As a form of the reactor according to another aspect, a form is conceivable in which the outer core portion is the resin core, and the inner core portion is the hybrid core.

When the inner core portion is constituted by the hybrid core, magnetic flux leakage to the outside of the inner core portion can be suppressed, and it is thus possible to suppress an energy loss that will be caused by the leakage flux permeating the coil.

As a form of the reactor according to another aspect, a form is conceivable in which the wire includes a conductor and an insulating coating that covers an outer periphery of the conductor and has a thickness of 0.01 mm or more, and the resin core constituting the inner core portion is in contact with an inner peripheral surface of the winding portion.

When the insulating coating of the wire has a thickness of 0.01 mm or more, insulation between the conductor of the wire and the inner core portion can be ensured even when the resin core is in contact with the inner peripheral surface of the winding portion. Moreover, the inner core portion can have such a size that the inner core portion comes into contact with the inner peripheral surface of the winding portion, and it is thus possible to reduce the size of the reactor while ensuring that the inner core portion has a sufficient magnetic circuit cross-sectional area.

As a form of the reactor according to another aspect, a form is conceivable in which the wire includes a conductor and an insulating coating that covers an outer periphery of the conductor and has a thickness of less than 0.01 mm, and an inner interposed member having a thickness of 0.1 mm or more is provided between an outer peripheral surface of the inner core portion and an inner peripheral surface of the winding portion.

When the inner interposed member having a thickness of 0.1 mm or more is provided, sufficient insulation can be ensured between the inner peripheral surface of the winding portion and the outer peripheral surface of the inner core portion. Moreover, since the insulation between the winding portion and the inner core portion can be ensured, the insulating coating of the wire can have a thickness of less than 0.01 mm. Since the insulating coating can be made thin, the length of the winding portion in the axial direction can be reduced, and the size of the reactor can thus be reduced.

As a form of the reactor according to the embodiment, a form is conceivable in which there is no interposed object between the powder compact and the resin core.

The magnetic core including the hybrid core, even without containing an interposed object such as a gap material, can be made unlikely to be magnetically saturated by adjusting the magnetic characteristics of the hybrid core. The magnetic core having no interposed object (gap material) can be produced without having to spend time and effort on forming the interposed object, and the productivity of the reactor can thus be improved.

Advantageous Effects of the Present Disclosure

The reactor according to the present disclosure makes it easy to adjust the magnetic characteristics and has excellent productivity.

DETAILED DESCRIPTION OF PREFERRED EMBODIMENTS

Figure 1:
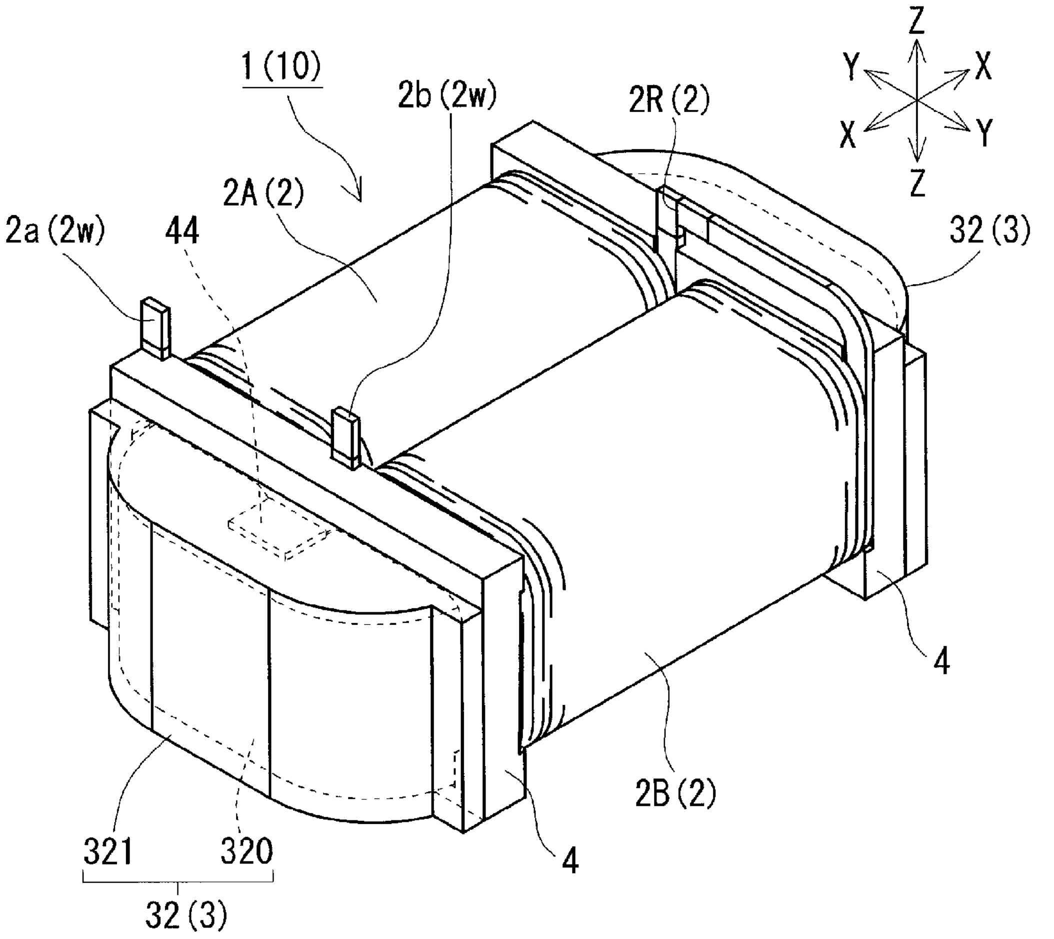
FIG. 1 is a perspective view of a reactor of Embodiment 1.

Hereinafter, embodiments of a reactor of the present disclosure will be described based on the drawings. In the drawings, like reference numerals denote objects having like names. It should be understood that the present invention is not to be limited to configurations described in the embodiments, but rather is to be defined by the appended claims, and all changes that come within the meaning and range of equivalency of the claims are intended to be embraced therein.

Embodiment 1

In Embodiment 1, a configuration of a reactor 1 will be described based on FIGS. 1, 2A, 2B, 3A, and 3B. The reactor 1 shown in FIG. 1 includes an assembly 10 in which a coil 2, a magnetic core 3, and holding members 4 are combined. The magnetic core 3 includes inner core portions 31 (FIG. 2A) and outer core portions 32. One of the features of this reactor 1 is that the outer core portions 32 are hybrid cores each composed of a powder compact 320 and a resin core 321 that covers an outer periphery thereof. Hereinafter, various components included in the reactor 1 will be described in detail.

Coil

As shown in FIG. 1, the coil 2 of the present embodiment includes a pair of winding portions 2A and 2B as well as a connecting portion 2R that connects the two winding portions 2A and 2B to each other. The winding portions 2A and 2B are formed into hollow tube shapes with the same number of turns and the same winding direction, and are arranged side-by-side such that their axial directions are parallel to each other. In the present example, the coil 2 is produced by connecting the winding portions 2A and 2B that are produced using separate wires 2*w*, but the coil 2 may also be produced using a single wire 2*w*.

In the present embodiment, directions of the reactor 1 are defined with respect to the coil 2. First, a direction along the axial direction of the winding portions 2A and 2B of the coil 2 is defined as "direction X". A direction that is orthogonal to the direction X and extends along the direction in which the winding portions 2A and 2B are arranged side-by-side is defined as "direction Y". Then, a direction that intersects (is orthogonal to) both the direction X and the direction Y is defined as "direction Z".

The winding portions 2A and 2B of the present embodiment are formed into a rectangular tube shape. The "rectangular tube-shaped winding portions 2A and 2B" means winding portions whose end surfaces have a rectangular shape (including a square shape) with rounded corners. It goes without saying that the winding portions 2A and 2B may also be formed into a cylindrical tube shape. A "cylindrical tube-shaped winding portion" means a winding portion whose end surfaces have a closed curved shape (elliptical shape, perfect circle shape, racetrack shape, or the like).

Figure 2A:
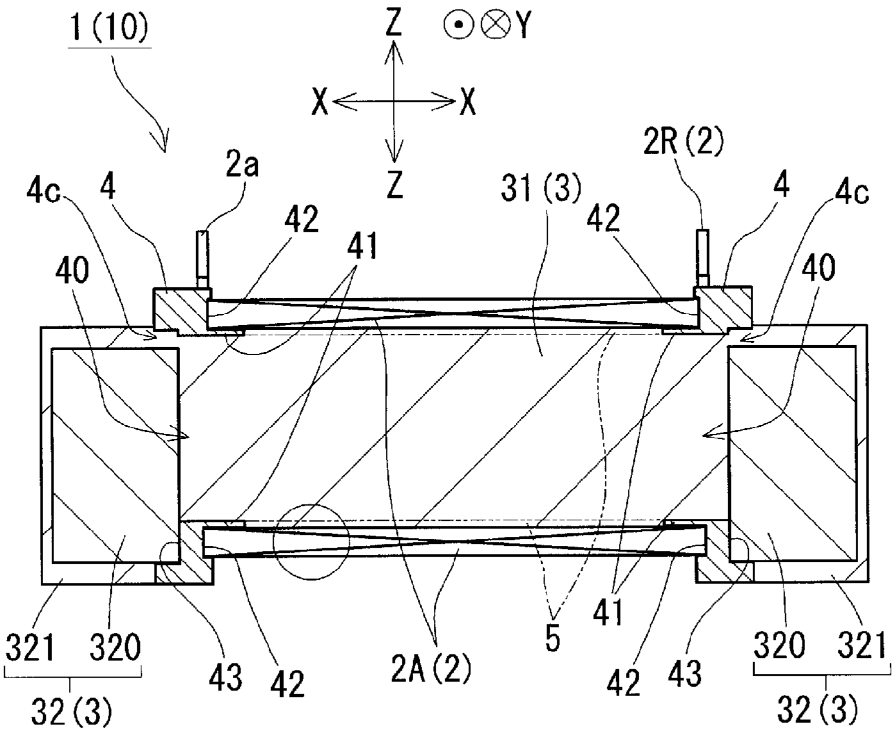
FIG. 2A is a schematic vertical cross-sectional view of the reactor in FIG. 1.
Figure 2B:
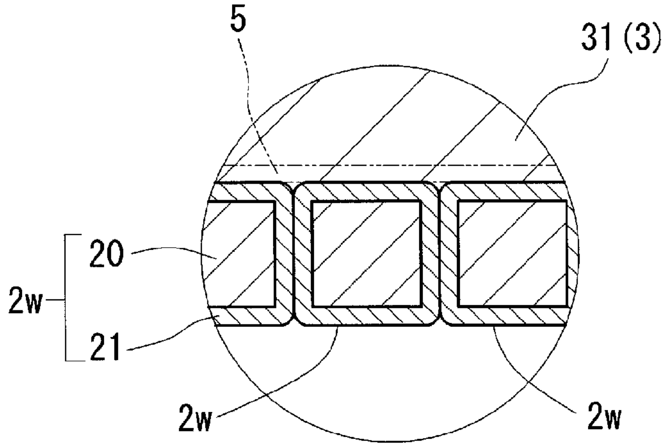
FIG. 2B is an enlarged cross-sectional view of a portion surrounded by the circle in FIG. 2A.

As shown in FIG. 2B, each wire 2*w* may be constituted by a coated wire including a conductor 20 and an insulating coating 21 that covers an outer periphery of the conductor 20. The conductor 20 may be a rectangular wire, a round wire, or the like made of a conductive material, such as copper, aluminum, magnesium, or an alloy thereof. The insulating coating 21 is made of an insulating material such as an enamel (polyamide or polyamideimide). In the present example, the winding portions 2A and 2B are each formed by winding a coated rectangular wire serving as the wire 2*w* edgewise.

Both end portions 2*a* and 2*b* of the coil 2 are drawn out of the winding portions 2A and 2B, respectively, and connected to terminal members (not shown). At each of the end portions 2*a* and 2*b*, the insulating coating 21 made of an enamel or the like has been stripped off. External devices such as a power supply that supplies power to the coil 2 are connected thereto via the terminal members.

In the present example, the inner core portions 31 are in contact with inner peripheral surfaces of the respective winding portions 2A and 2B. Therefore, in order to ensure insulation between the conductors 20 of the winding portions 2A and 2B and the respective inner core portions 31, the insulating coating 21 of each wire 2*w* has a thickness of 0.01 mm or more. An excessively thick insulating coating 21 results in an increase in the size of the coil 2, and hence an increase in the size of the reactor 1, and it is therefore preferable that the insulating coating 21 has a thickness of 0.1 mm or less. More preferably, the insulating coating 21 has a thickness of 0.01 mm or more and 0.05 mm or less. In the case where an inner interposed member 5 is provided between each winding portion 2A, 2B and the corresponding inner core portion 31 as will be described later, the insulating coating 21 of each wire 2*w* may have a thickness of less than 0.01 mm.

Magnetic Core

As shown in FIG. 2A, the magnetic core 3 is a seamless single magnetic body. For the sake of convenience, the magnetic core 3 can be divided into the inner core portions 31 that are arranged inside the winding portion 2A and the winding portion 2B, respectively, and the outer core portions 32 that form a ring-shaped closed magnetic circuit together with the inner core portions 31.

Inner Core Portions

The inner core portions 31 are those portions of the magnetic core 3 that extend along the axial direction of the winding portions 2A and 2B of the coil 2. In the present example, opposite end portions of each of the portions of the magnetic core 3 that extend along the axial direction of the winding portions 2A and 2B protrude from end surfaces of the corresponding winding portion 2A, 2B. These protruding portions are also included in the inner core portions 31. The end portions of the inner core portions 31 in the axial direction that protrude from the winding portions 2A and 2B extend into through holes 40 of the holding members 4, which will be described later, and are continuous with resin cores 321 of the outer core portions 32.

Each inner core portion 31 of the present example is constituted by a magnetic body (resin core) obtained by molding a composite material containing a soft magnetic powder and a resin, and is a non-dividable structure in which no gap material (interposed object) is present. However, unlike the present example, it is also possible that a plate-shaped gap material is embedded in the inner core portion 31. The resin core will be described later in another section.

The inner core portions 31 constituted by the resin cores are formed by filling the composite material into the winding portions 2A and 2B and then curing the composite material. Thus, the resin cores constituting the inner core portions 31 are in contact with the inner peripheral surfaces of the respective winding portions 2A and 2B (see FIG. 2B). That is to say, the inner core portions 31 have outer shapes that conform to the shapes of the inner peripheral surfaces of the winding portions 2A and 2B, respectively.

Outer Core Portions

The outer core portions 32 are those portions of the magnetic core 3 that are arranged outside the winding portions 2A and 2B (FIG. 1). There is no particular limitation on the shapes of the outer core portions 32, and any shape can be used that connects the end portions of the pair of inner core portions 31 to each other. The outer core portions 32 of the present example are blocks having substantially dome-shaped upper and lower surfaces.

Each outer core portion 32 of the present example is a hybrid core composed of a powder compact 320 that is a magnetic body obtained by compression molding a soft magnetic powder and a resin core 321 that is molded on an outer periphery of the powder compact 320. In the hybrid core, no interposed object, such as a gap material, is present between the powder compact 320 and the resin core 321. As already described above, the resin cores 321 of the outer core portions 32 are continuous with the inner core portions 31 (resin cores) via the through holes 40 of the holding members 4. The resin cores 321 of the outer core portions 32 have the same composition as the resin cores constituting the inner core portions 31.

Powder Compacts

The powder compacts 320 can be produced by filling a raw material powder into a mold and then applying pressure thereto. Because of the production method, it is easy to increase the amount of soft magnetic powder contained in a powder compact. For example, the powder compacts 320 can contain the soft magnetic powder in an amount of more than 80 vol %, or even 85 vol % or more. For this reason, with the powder compacts 320, core portions 31 or 32 having a high saturation magnetic flux density and a high relative magnetic permeability are likely to be obtained. For example, the powder compacts 320 can have a relative magnetic permeability of 50 or more and 500 or less, or even 200 or more and 500 or less.

The soft magnetic powder of the powder compacts 320 is a collection of soft magnetic particles made of an iron-group metal such as iron, an alloy thereof (a Fe—Si alloy, a Fe—Ni alloy, etc.), or the like. An insulating coating made of a phosphate or the like may also be formed on the surface of the soft magnetic particles. Moreover, the raw material powder may also contain a lubricant and the like.

Resin Cores

The resin cores 321 included in the outer core portions 32 and the resin cores constituting the inner core portions 31 can be produced by molding a composite material in which a soft magnetic powder and an uncured resin are mixed and then curing the resin. That is to say, the resin cores are molded bodies of the composite material in which the soft magnetic powder is dispersed in the resin. Because of the production method, it is easy to adjust the amount of soft magnetic powder contained in the composite material. For example, the composite material can contain the soft magnetic powder in an amount of 30 vol % or more and 80 vol % or less. From the viewpoint of improving the saturation magnetic flux density and the heat dissipation properties, it is more preferable that the magnetic powder is contained in an amount of 50 vol % or more, 60 vol % or more, or 70 vol % or more. On the other hand, from the viewpoint of improving the fluidity of the composite material during the production process, it is preferable that the magnetic powder is contained in an amount of 75 vol % or less. For the resin cores 321 and the inner core portions 31, if the filling ratio of the soft magnetic powder is adjusted to a low value, the specific magnetic permeability is likely to become low. For example, the resin cores 321 and the inner core portions 31 can have a specific magnetic permeability of 5 or more and 50 or less, or even 20 or more and 50 or less.

As the soft magnetic powder of the composite material, it is possible to use the same soft magnetic powder as that which can be used in the powder compacts 320. On the other hand, as the resin contained in the composite material, a thermosetting resin, a thermoplastic resin, a normal-temperature curing resin, a low-temperature curing resin, and the like can be used. Examples of the thermosetting resin include unsaturated polyester resins, epoxy resins, urethane resins, silicone resins, and the like. Examples of the thermoplastic resin include polyphenylene sulfide (PPS) resins, polytetrafluoroethylene (PTFE) resins, liquid crystal polymers (LCPs), polyamide (PA) resins such as nylon 6 and nylon 66, polybutylene terephthalate (PBT) resins, acrylonitrile-butadiene-styrene (ABS) resins, and the like. In addition, a BMC (bulk molding compound) produced by mixing calcium carbonate and glass fibers in unsaturated polyester, millable silicone rubber, millable urethane rubber, and the like can also be used. The above-described composite material may also contain a non-magnetic, nonmetal powder (filler) such as alumina or silica, in addition to the soft magnetic powder and the resin, and in this case the heat dissipation properties can be improved even more. The non-magnetic, nonmetal powder may be contained in an amount of 0.2 mass % or more and 20 mass % or less, or even 0.3 mass % or more and 15 mass % or less, or 0.5 mass % or more and 10 mass % or less.

Holding Members

The holding members 4 are provided between the end surfaces of the winding portions 2A and 2B of the coil 2 and the respective outer core portions 32 of the magnetic core 3, and hold the end surfaces of the winding portions 2A and 2B and the respective outer core portions 32. The holding members 4 are typically made of an insulating material and function as insulating members between the coil 2 and the magnetic core 3 as well as positioning members that position the inner core portions 31 and the respective outer core portions 32 relative to the winding portions 2A and 2B. The two holding members 4 of the present example have the same shape. For this reason, the holding members 4 can be produced using the same mold, and the holding members 4 thus have excellent productivity.

Figure 3A:
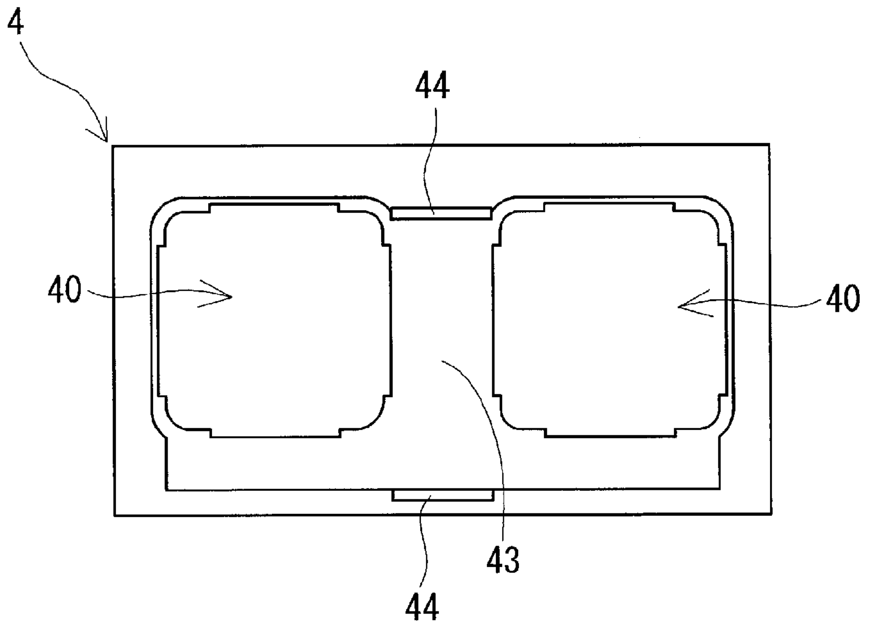
FIG. 3A is a front view of a holding member included in the reactor in FIG. 1.
Figure 3B:
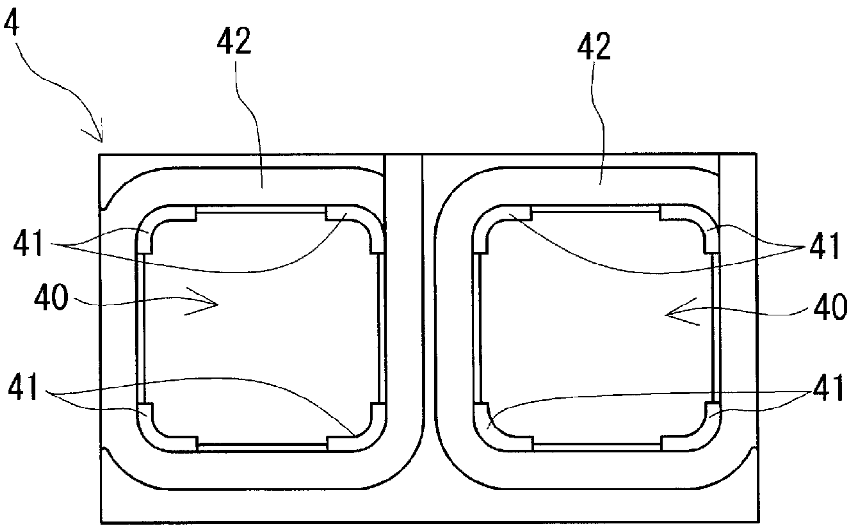
FIG. 3B is a rear view of the holding member included in the reactor in FIG. 1.

The holding members 4 will be described with reference mainly to FIGS. 3A, 3B, and 4. FIG. 3A is a front view of a holding member 4 when viewed from a side on which the corresponding outer core portion 32 (FIGS. 1 and 2A) is to be arranged, FIG. 3B is a rear view of the holding member 4 when viewed from a side on which the coil 2 (FIGS. 1 and 2A) is to be arranged.

Each holding member 4 includes a pair of through holes 40, a plurality of coil supporting portions 41 (FIG. 3B), a pair of coil housing portions 42 (FIG. 3B), a single core housing portion 43 (FIG. 3A), and a pair of retaining portions 44 (FIG. 3A). The through holes 40 penetrate the holding member 4 in its thickness direction, and end portions of the inner core portions 31 extend into the through holes 40 (see FIG. 2A). The coil supporting portions 41 are arc-shaped pieces partially protruding from inner peripheral surfaces of the through holes 40 and supporting corner portions of the inner peripheral surfaces of the winding portions 2A and 2B (FIG. 2A). The coil housing portions 42 are recesses that conform to the end surfaces of the respective winding portions 2A and 2B (FIG. 1), and these end surfaces and nearby portions are fitted into the coil housing portions 42. As shown in FIG. 2A, a bottom surface (portion indicated by the leader line) of the coil housing portion 42 and the end surface of the corresponding winding portion 2A (2B) are in close contact with each other with substantially no space left therebetween. The core housing portion 43 is formed by a portion of a surface of the holding member 4 that faces the corresponding outer core portion 32 being recessed in the thickness direction, and an inner surface and a nearby portion of the powder compact 320 of the outer core portion 32 are fitted into the core housing portion 43. As shown in FIG. 2A, the powder compact 320 is in contact with a bottom surface (portion indicated by the leader line) of the core housing portion 43. The upper retaining portion 44 and the lower retaining portion 44 are each provided at a middle position of the holding member 4 in its width direction (direction Y), and retain an upper surface and a lower surface of the outer core portion 32 that has been fitted into the core housing portion 43, which will be described later.

Here, middle portions (portions other than the coil supporting portions 41) of an upper edge portion, a lower edge portion, and two lateral side edge portions of each through hole 40 of the present example protrude outward in a radial direction of the through hole 40. On the other hand, the core housing portion 43 shown in FIG. 3A is a shallow recess having the bottom surface including the above-described through holes 40. When the powder compact 320 has been fitted into the core housing portion 43, the inner surface of the powder compact 320 fitted into the core housing portion 43 abuts against and is supported by an inverted T-shaped surface, of the bottom surface of the core housing portion 43, that is formed by a portion sandwiched between the pair of through holes 40 and a portion located below the through holes 40. As shown in FIG. 4, in a front view of the powder compact 320 when viewed from its outer surface side, the core housing portion 43 has a shape that generally conforms to the outline of the powder compact 320, but an upper edge portion, and upper portions of lateral side edge portions, of the core housing portion 43 protrude outward from the above-described outline. Portions other than the outward protruding portions conform to the outline of the outer core portion 32, and the powder compact 320 fitted into the core housing portion 43 is thus restrained from moving in a left-right direction (direction in which the through holes 40 are arranged side-by-side).

Figure 4:
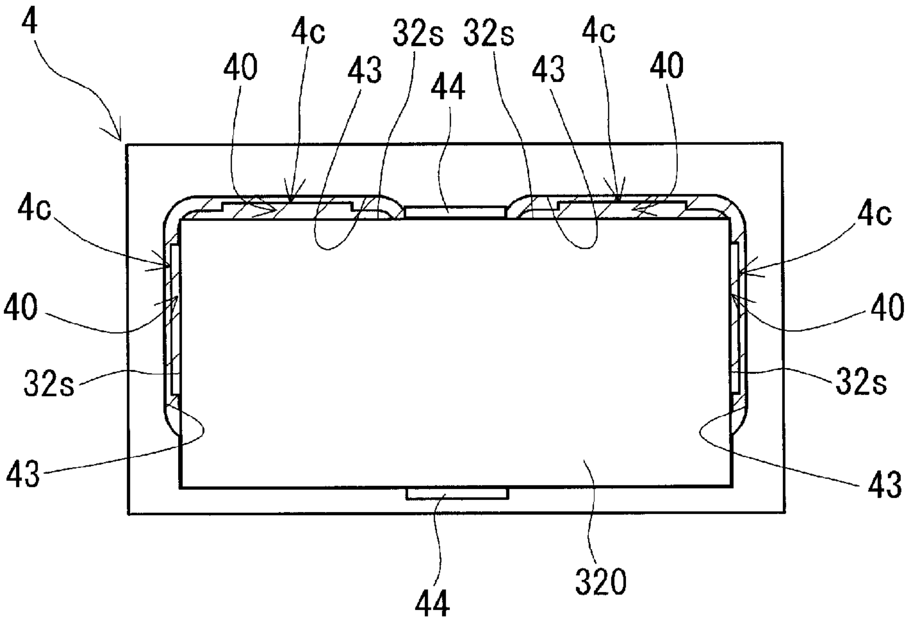
FIG. 4 is a view showing the holding member in FIG. 3 and a powder compact of an outer core portion that have been combined.

As shown in FIG. 4, when the powder compact 320 has been fitted into the above-described core housing portion 43, spaces are formed between an inner wall surface (portions indicated by the leader lines) of the core housing portion 43 and a peripheral surface of the outer core portion 32. In FIG. 4, these spaces (spaced-apart portions 4*c*) are indicated by hatching at 45°. The spaced-apart portions 4*c* are in communication with the through holes 40 on the back side. The spaced-apart portions 4*c* function as flow paths for the composite material that forms the inner core portions 31, as will be described later in the description of a method for producing the reactor 1. In the reactor 1, which is the finished product, the spaced-apart portions 4*c* are filled with resin cores made of the cured composite material, and the resin cores are continuous with the respective resin cores constituting the inner core portions 31 and the resin core 321 of the outer core portion 32.

The holding members 4 can be made of, for example, thermoplastic resins such as polyphenylene sulfide (PPS) resins, polytetrafluoroethylene (PTFE) resins, liquid crystal polymers (LCPs), polyamide (PA) resins such as nylon 6 and nylon 66, polybutylene terephthalate (PBT) resins, and acrylonitrile-butadiene-styrene (ABS) resins. In addition, the holding members 4 can also be made of thermosetting resins such as unsaturated polyester resins, epoxy resins, urethane resins, and silicone resins. It is also possible to improve the heat dissipation properties of the holding members 4 by mixing a ceramic filler into the above-described resins. For example, a non-magnetic powder such as alumina or silica can be used as the ceramic filler.

Others

Other components included in the reactor 1 may include inner interposed members 5 (see the phantom lines in FIGS. 2A and 2B) provided between outer peripheral surfaces of the inner core portions 31 and the inner peripheral surfaces of the winding portions 2A and 2B.

The inner interposed members 5 are members mainly for reliably ensuring insulation between the inner core portions 31 and the winding portions 2A and 2B, and can be made of the above-described materials that can be used for the holding members 4. In view of the function of the inner interposed members 5, it is preferable that the inner interposed members 5 are tube-shaped and do not have a through hole in peripheral walls of the tubes. Moreover, in view of the function of the inner interposed members 5, it is preferable that the inner interposed members 5 have a thickness of 0.1 mm or more. An excessively large thickness of the inner interposed members 5 makes it difficult for heat generated by the inner core portions 31 to be dissipated to the outside of the assembly 10, and it is therefore preferable that the inner interposed members 5 have a thickness of 1 mm or less. In the present example, inner peripheral surfaces of the inner interposed members 5 are continuous with the inner peripheral surfaces of the respective through holes 40 of each holding member 4 without a level difference therebetween, outer peripheral surfaces of the inner interposed members 5 are continuous with inner wall surfaces of the respective coil housing portions 42 without a level difference therebetween, and the inner interposed members 5 have a thickness of 0.5 mm.

When the inner interposed members 5 are used, sufficient insulation between the winding portions 2A and 2B and the respective inner core portions 31 is ensured, and therefore, the insulating coating 21 of each wire 2*w* can have a thickness of less than 0.01 mm. When the insulating coating 21 is thin, the length of the winding portions 2A and 2B in the axial direction can be reduced, and the size of the reactor 1 can thus be reduced.

The inner interposed members 5 may be formed as members separate from the holding members 4, or may be integrally formed with the holding members 4. In the case where the inner interposed members 5 are integrated with the holding members 4, it is preferable to employ a configuration in which half of each inner interposed member 5 divided in the axial direction is integrated with one of the holding members 4, and the other half is integrated with the other of the holding members 4. In this case, tubular members in each of which the holding member 4 and the halves of the inner interposed members 5 are integrated can be produced using only a single mold. Moreover, these tubular members can be inserted into the winding portions 2A and 2B through openings at the end portions thereof, and it is thus easy to assemble the tubular members to the winding portions 2A and 2B.

Forms of Uses

The reactor 1 of the present example can be used as a constituent member of power converters, such as bidirectional DC-DC converters, installed in electric vehicles such as hybrid automobiles, electric automobiles, and fuel-cell electric automobiles. The reactor 1 of the present example can be used in a state of being immersed in a liquid refrigerant. There is no limitation on the liquid refrigerant, and if the reactor 1 is used in a hybrid automobile, ATF (automatic transmission fluid) and the like can be used as the liquid refrigerant. In addition, fluorine-based inert liquids such as Fluorinert (registered trademark), fluorocarbon refrigerants such as HCFC-123 and HFC-134a, alcohol refrigerants such as methanol and alcohol, ketone refrigerants such as acetone, and the like can also be used as the liquid refrigerant. In the reactor 1 of the present example, the winding portions 2A and 2B are exposed to the outside. Therefore, when cooling the reactor 1 with a cooling medium such as a liquid refrigerant, it is possible to bring the winding portions 2A and 2B into direct contact with the cooling medium, and the reactor 1 of the present example thus has excellent heat dissipation properties.

Effects

In the reactor 1 of the present example, since the outer core portions 32 are hybrid cores, even though the magnetic core 3 is a seamless single body, it is easy to adjust the magnetic characteristics of the magnetic core 3. For example, even in the case of a magnetic core 3 whose size is reduced by increasing the magnetic permeability of the magnetic core 3, the magnetic core 3 can be made unlikely to be magnetically saturated. If the size of the magnetic core 3 can be reduced, the size of the entire reactor 1 can also be reduced.

Moreover, in the reactor 1 of the present example, the outer core portions 32 are constituted by hybrid cores, which are unlikely to allow magnetic flux leakage to the outside. Therefore, magnetic flux leakage to the outside of the outer core portions 32 can be suppressed, and the effect of the leakage flux on other electric devices installed near the reactor 1 can be reduced.

Furthermore, in the reactor 1 of the present example, the magnetic core 3 is a seamless single body, and thus has excellent productivity. This will be described in the description of a method for producing a reactor below.

Method for Producing Reactor

Next, an example of a method for producing a reactor that is used to produce the reactor 1 according to Embodiment 1 will be described. Roughly speaking, the method for producing a reactor includes the following steps.

Coil producing step
Assembling step
Filling step
Curing step

Coil Producing Step

In this step, a coil 2 is produced by preparing a wire 2*w* and winding a portion of the wire 2*w*. A known winding machine can be used to wind the wire 2*w*. It is also possible to form a thermally fusion-bondable resin layer on the surface of the wire 2*w*, form winding portions 2A and 2B by winding the wire 2*w*, and then heat-treat the coil 2. In this case, the turns of each of the winding portions 2A and 2B can be integrated, and it is thus easy to perform the filling step, which will be described later.

Assembling Step

In the assembling step, the coil 2, holding members 4, and powder compacts 320 are combined. Specifically, a first assembly is produced in which the holding members 4 are fitted to the end surfaces of the winding portions 2A and 2B on one end side in the axial direction, and the end surfaces of the winding portions 2A and 2B on the other end side in the axial direction, respectively, and furthermore, the powder compacts 320 are fitted into the core housing portions 43 (FIG. 3A) of the respective holding members 4. Here, as already described with reference to FIG. 4, when the first assembly is viewed from the outer side of an outer core portion 32, spaced-apart portions 4*c* through which the composite material is filled into the winding portions 2A and 2B are formed at portions of the lateral side edges and the upper edge of the outer core portion 32.

Filling Step

Figure 5:
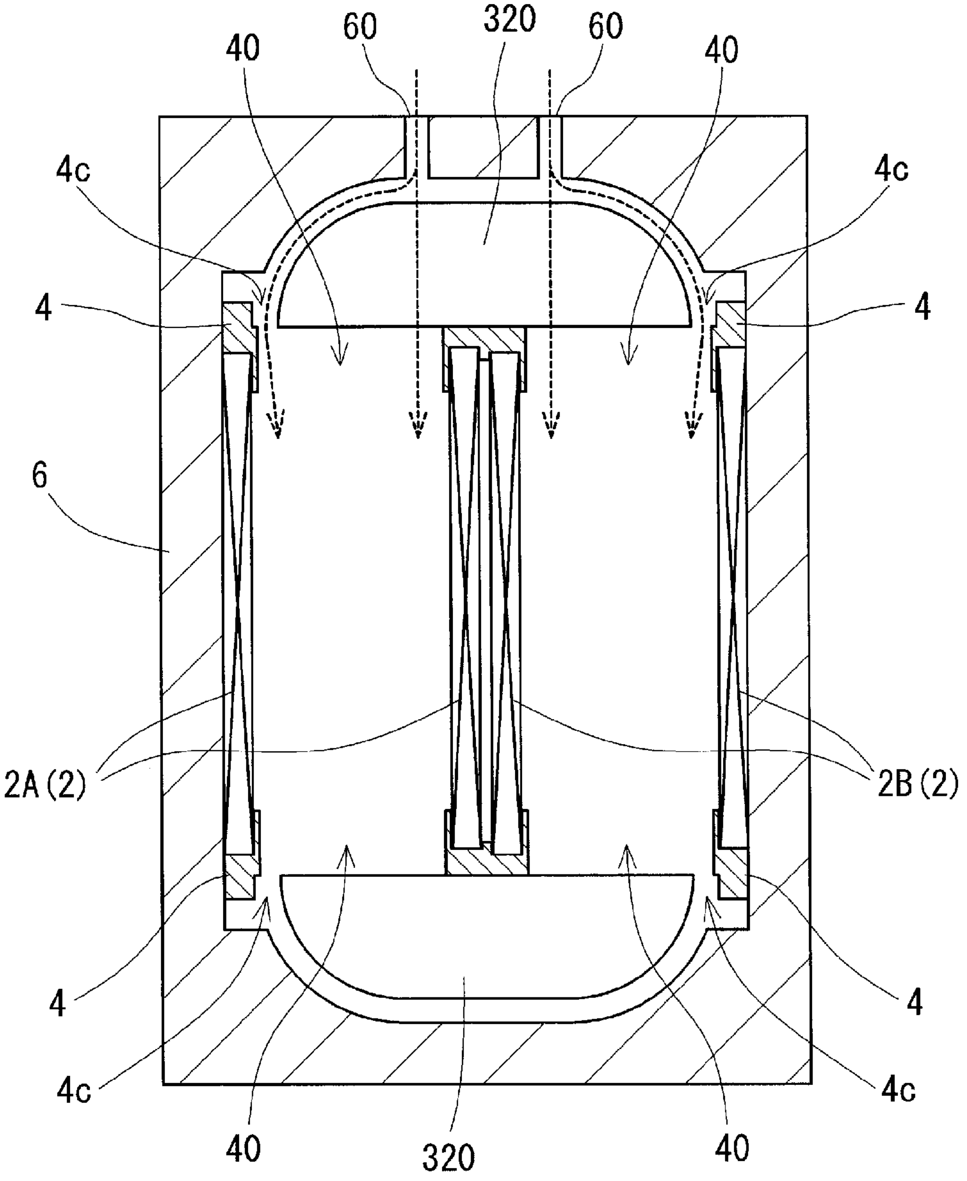
FIG. 5 is an explanatory diagram illustrating procedures for producing the reactor in FIG. 1.

In the filling step, as shown in FIG. 5, the above-described first assembly is arranged in a mold 6. In the mold 6, the outer peripheral surfaces of the winding portions 2A and 2B are in contact with an inner peripheral surface of the mold 6, and the powder compacts 320 are spaced apart from the inner peripheral surface of the mold 6 using spacers, which are not shown. In the present example, injection molding is performed in which the composite material is injected into the mold 6. The injection molding pressure is, for example, 10 MPa or more.

The composite material is injected through injection holes 60 formed in the mold 6. The injection holes 60 are formed at positions corresponding to the outer surface of one of the powder compacts 320. Therefore, as indicated by the dashed arrows, the composite material filled into the mold 6 covers the outer periphery of the outer core portion 32, and also moves around the outer peripheral surface of the outer core portion 32 and then flows into the spaced-apart portions 4*c* (see also FIG. 4). The composite material flowing into the spaced-apart portions 4*c* further flows into the inside of the winding portions 2A and 2B via the through holes 40. The composite material flowing into the winding portions 2A and 2B reaches the powder compact 320 (lower side on the paper plane) via the through holes 40 on the side (lower side on the paper plane) on which the injection holes 60 are not formed, and then covers the outer periphery of the powder compact 320 via the spaced-apart portions 4*c*. The outer peripheral surfaces of the winding portions 2A and 2B are covered by the inner wall surface of the mold 6, and the high viscosity composite material is therefore prevented from leaking from the inside to the outside of the winding portions 2A and 2B. Thus, the composite material is not arranged on the outer peripheries of the winding portions 2A and 2B. Note that an injection hole 60 may also be formed at a position corresponding to the powder compact 320 that is shown on the lower side on the paper plane. In this case, the composite material is filled from two sides of the winding portions 2A and 2B in the axial direction.

Curing Step

In the curing step, the resin of the composite material is cured through heat treatment or the like. The portions of the cured composite material that are present inside the winding portions 2A and 2B constitute the inner core portions 31, and the portions of the cured composite material that cover the outer peripheries of the powder compacts 320 constitute the resin cores 321.

Effects

According to the above-described method for producing a reactor, the reactor 1 shown in FIG. 1 can be completed simply by arranging the coil 2, the holding members 4, and the powder compacts 320 in the mold 6, filling the composite material into the mold 6, and then curing the composite material. Moreover, according to the method for producing a reactor of the present example, since the inner core portions 31 and the resin cores 321 of the outer core portions 32 are integrally formed as a single body, the filling step and the curing step need to be performed only once, and it is thus possible to produce the reactor 1 with high productivity.

Embodiment 2

Figure 6:
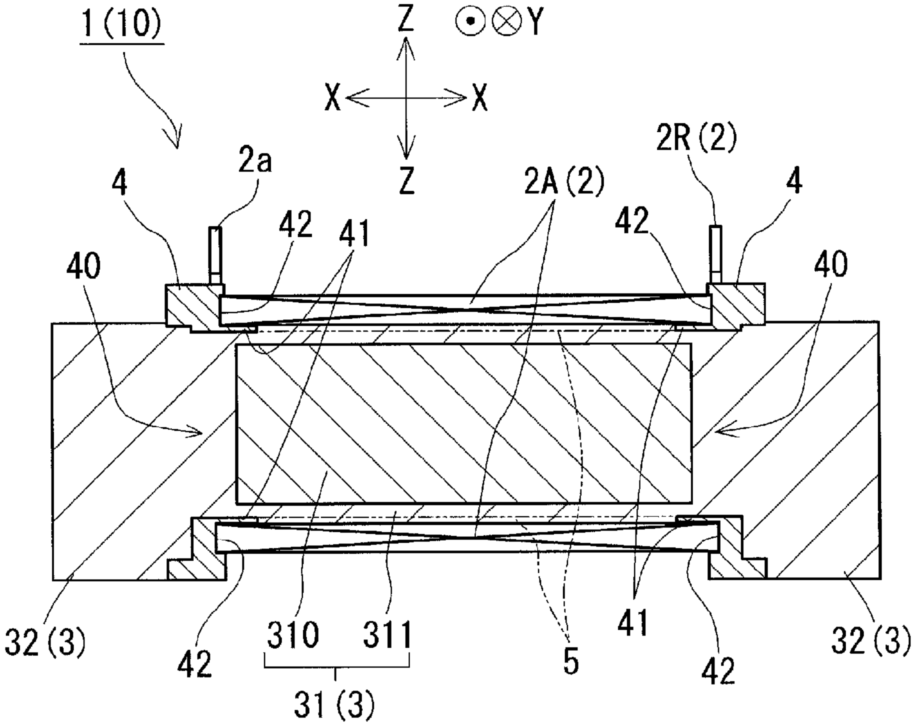
FIG. 6 is a schematic vertical cross-sectional view of a reactor of Embodiment 2.

In Embodiment 2, a reactor 1 in which inner core portions 31 are constituted by hybrid cores will be described based on a vertical cross-sectional view in FIG. 6. FIG. 6 shows a cross section taken at the same position as that of FIG. 2.

As shown in FIG. 6, in the reactor 1 of the present example, the entirety of each outer core portion 32 is constituted by a resin core, and each inner core portion 31 is composed of a powder compact 310 and a resin core 311 formed on an outer periphery of the powder compact 310.

In order to produce the reactor 1 of the present example, it is sufficient that a second assembly in which the coil 2, the holding members 4, and the powder compacts 310 are combined is arranged in the mold 6 shown in FIG. 5, and the composite material is then filled into the mold 6. The powder compacts 310 inside the winding portions 2A and 2B are spaced apart beforehand from the winding portions 2A and 2B using spacers or the like, which are not shown, so as to prevent the powder compacts 310 from being moved by the filling pressure of the composite material. The composite material filled into the mold 6 flows into the inside of the winding portions 2A and 2B via the through holes 40, while forming the outer core portions 32 shown in FIG. 6. Then, the reactor 1 shown in FIG. 6 can be completed by curing the resin of the composite material.

In the reactor 1 of the present example, the inner core portions 31 are constituted by hybrid cores, which are unlikely to allow magnetic flux leakage to the outside. Therefore, magnetic flux leakage to the outside of the inner core portions 31 can be suppressed, and an energy loss that will be caused by the leakage flux permeating the coil 2 can be suppressed.

Here, the configurations of Embodiments 1 and 2 may also be combined. That is to say, a reactor 1 in which both the inner core portions 31 and the outer core portions 32 are constituted by hybrid cores may be realized.

Embodiment 3

The reactors 1 of Embodiments 1 and 2 may also include a case that houses the assembly 10. In the case where a case is used, after the assembly 10 of Embodiment 1 or 2 has been produced, the assembly 10 may be housed in a case that has been prepared separately. Alternatively, the magnetic core 3 may be molded using a case as the mold. In the former case, it is preferable that an engagement portion that is engageable with the case is formed on the resin cores 321 of the outer core portions 32 (the outer core portions 32 themselves in the case of the configuration of Embodiment 2).

Hybrid Cores

Note that, although a description has been given to the effect that the hybrid cores of the present embodiment are formed by the resin cores filled into the mold being molded on the outer peripheries of the powder compacts, the present invention is not limited to this, and the hybrid cores may also be formed using a magnetic core in which both a powder compact and a resin core are used.

The invention claimed is:

1. A reactor comprising:

a coil having a winding portion that is formed by winding a wire;

a magnetic core having an inner core portion and a pair of outer core portions; and a holding member that holds an end surface of the winding portion in an axial direction and the outer core portion, the inner core portion formed entirely of a resin core, the resin core is a magnetic body having a soft magnetic powder is dispersed in a resin and being arranged inside the winding portion, each of the pair of outer core portions being arranged outside the winding portion and the inner core portion interposed between the pair of outer core portions, and the holding member being a frame-like member having a through hole into which an end portion of the inner core portion in the axial direction is inserted, wherein each of the pair of outer core portions is a hybrid core composed of a powder compact and a resin core is molded on an outer periphery of the powder compact so as to completely surround the powder compact, the resin core of the inner core portion and the resin core of both of the pair of outer core portions are continuous with each other via the through hole of the holding member and form a single body, and the powder compact is a magnetic body obtained by compression molding a raw material powder containing a soft magnetic powder, and the resin core is a magnetic body obtained by molding a composite material in which a soft magnetic powder is dispersed in a resin.

2. The reactor according to claim 1, wherein the holding member has, on one surface side thereof, a core housing portion that houses a portion of the powder compact of each of the pair of outer core portions, core housing portion having an inner wall surface that protrudes in a direction away from a peripheral surface of the powder compact so as to support the powder compact, and a spaced-apart portion where the inner wall surface and the peripheral surface are spaced apart from each other is provided at the protruding position of the inner wall surface, and the spaced-apart portion is in communication with the through hole.

3. The reactor according to claim 1, wherein the wire includes a conductor and an insulating coating that covers an outer periphery of the conductor and has a thickness of 0.01 mm or more, and the resin core constituting the inner core portion is in contact with an inner peripheral surface of the winding portion.

4. The reactor according to claim 1, wherein the wire includes a conductor and an insulating coating that covers an outer periphery of the conductor and has a thickness of less than 0.01 mm, and an inner interposed member having a thickness of 0.1 mm or more is provided between an outer peripheral surface of the inner core portion and an inner peripheral surface of the winding portion.

5. The reactor according to claim 1, wherein there is no interposed object between the powder compact and the resin core.

* * * * *